(12) United States Patent
Ishiyone et al.

(10) Patent No.: US 8,044,625 B2
(45) Date of Patent: Oct. 25, 2011

(54) WIPER APPARATUS

(75) Inventors: Naoki Ishiyone, Wako (JP); Koji Yamaoka, Wako (JP); Masayuki Yamazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 616 days.

(21) Appl. No.: 12/180,974

(22) Filed: Jul. 28, 2008

(65) Prior Publication Data

US 2009/0033267 A1 Feb. 5, 2009

(30) Foreign Application Priority Data

Aug. 2, 2007 (JP) ................................. 2007-201987

(51) Int. Cl.
*H02P 1/04* (2006.01)
(52) U.S. Cl. ........................... 318/444; 318/443; 318/50
(58) Field of Classification Search .................. 318/444, 318/443, 50, 34, 35, 49
See application file for complete search history.

(56) References Cited

U.S. PATENT DOCUMENTS

| 4,999,550 A | 3/1991 | Jones |
| 2010/0175216 A1* | 7/2010 | Natsume .................... 15/250.12 |

FOREIGN PATENT DOCUMENTS

| EP | 0691249 A1 | 1/1996 |
| JP | 10-001028 A | 1/1998 |
| JP | 2004-148897 A | 5/2004 |

\* cited by examiner

*Primary Examiner* — Karen Masih
(74) *Attorney, Agent, or Firm* — Arent Fox, LLP

(57) ABSTRACT

A wiper apparatus includes: a wiper switch; an operation state detection device; a control device having an output section and an input section; a wiper motor; and a power supply. The wiper motor and the control device are connected by a single signal line; the operation state detection device and the input section are connected to the signal line; and the control device performs input of the wiper operating signal from the signal line when a predetermined period of time has elapsed from a point in time when an output of a wiper driving signal from the output section has stopped.

2 Claims, 7 Drawing Sheets

WIPER APPARATUS

BACKGROUND OF THE INVENTION

Priority is claimed on Japanese Patent Application No. 2007-201987, filed Aug. 2, 2007, the contents of which are incorporated herein by reference.

FIELD OF THE INVENTION

The present invention relates to a wiper apparatus.

DESCRIPTION OF THE RELATED ART

Conventionally, there has been known a wiper apparatus that is provided with: a signal line that outputs a wiper driving signal to a motor that reciprocates a wiper blade of a vehicle; and a signal line that inputs a position determination signal from a sensor that detects a stop position of the wiper blade, and the wiper apparatus outputs the wiper driving signal when a predetermined period of time has elapsed from input of the position determination signal (for example, refer to Japanese Unexamined Patent Application, First Publication No. H10-1028).

In the above conventional wiper apparatus, in the case of drive controlling wipers on the front/rear windows of the vehicle, the length of each of the signal lines becomes relatively long. Therefore, there has been a demand to reduce the number of required signal lines to thereby reduce manufacturing cost.

Considering such circumstances, for example, it may be considered to share a single signal line to perform wiper driving signal output and position determination signal input. However, in this case, it becomes difficult to differentiate each of the signals. As a measure for addressing this issue, for example, it may be considered to execute wiper driving signal output at a predetermined cycle regardless of the position determination signal. However, in this case, if the operation state of the wiper blade changes due to the condition of the window or the weather, there is concern that the wiper may not be operated at an appropriate timing.

The present invention takes the above circumstances into consideration, with an object of providing a wiper apparatus that reduces the cost required for configuring the wiper apparatus and the space required for installation of the apparatus, while enabling appropriate operation of the wiper.

SUMMARY OF THE INVENTION

In order to solve the above problems and achieve the above object, the present invention employs the following measure.

That is to say, a wiper apparatus of the present invention is provided with: a wiper switch that outputs an operation selection signal according to selections made upon the presence of operation of a wiper and set period of time for operation intervals; an operation state detection device that detects an operation state of the wiper and outputs a wiper operating signal; a control device provided with an output section that outputs a wiper driving signal for driving the wiper based on the operation selection signal and the wiper operating signal, and an input section that inputs the wiper operating signal; a wiper motor that drives the wiper according to the wiper driving signal; and a power supply that supplies electric power to the wiper motor. The wiper motor and the control device are connected by a single signal line; the operation state detection device and the input section are connected to the signal line; and the control device performs input of the wiper operating signal from the signal line when a predetermined period of time has elapsed from a point in time when an output of the wiper driving signal from the output section has stopped.

According to the above wiper apparatus, in a state where a wiper operating signal and a wiper driving signal can be differentiated from each other, the input section and the output section can share the single signal line. Consequently, it is possible to ensure desired reliability for the operation of the wiper and reduce the cost required for configuring the apparatus, while reducing the weight of the apparatus and the wiring space required for wiring the signal line.

The control device may output the wiper driving signal when a predetermined set period of time has elapsed from a point in time when input of the wiper operating signal has stopped.

In this case, the wiper driving signal is output when a predetermined set period of time has elapsed from the point in time when the input of the wiper operating signal has stopped. Consequently, for example, in the case where the wiper blade stops at a position other than a predetermined origin position, it is possible to prevent excessively frequent outputs of the wiper driving signal. As a result, it is possible to prevent the occurrence of an operation not intended by the operator, and to prevent an increase in power consumption.

DETAILED DESCRIPTION OF THE INVENTION

Hereunder is a description of a wiper apparatus according to an embodiment of the present invention, with reference to accompanying drawings.

Figure 1:
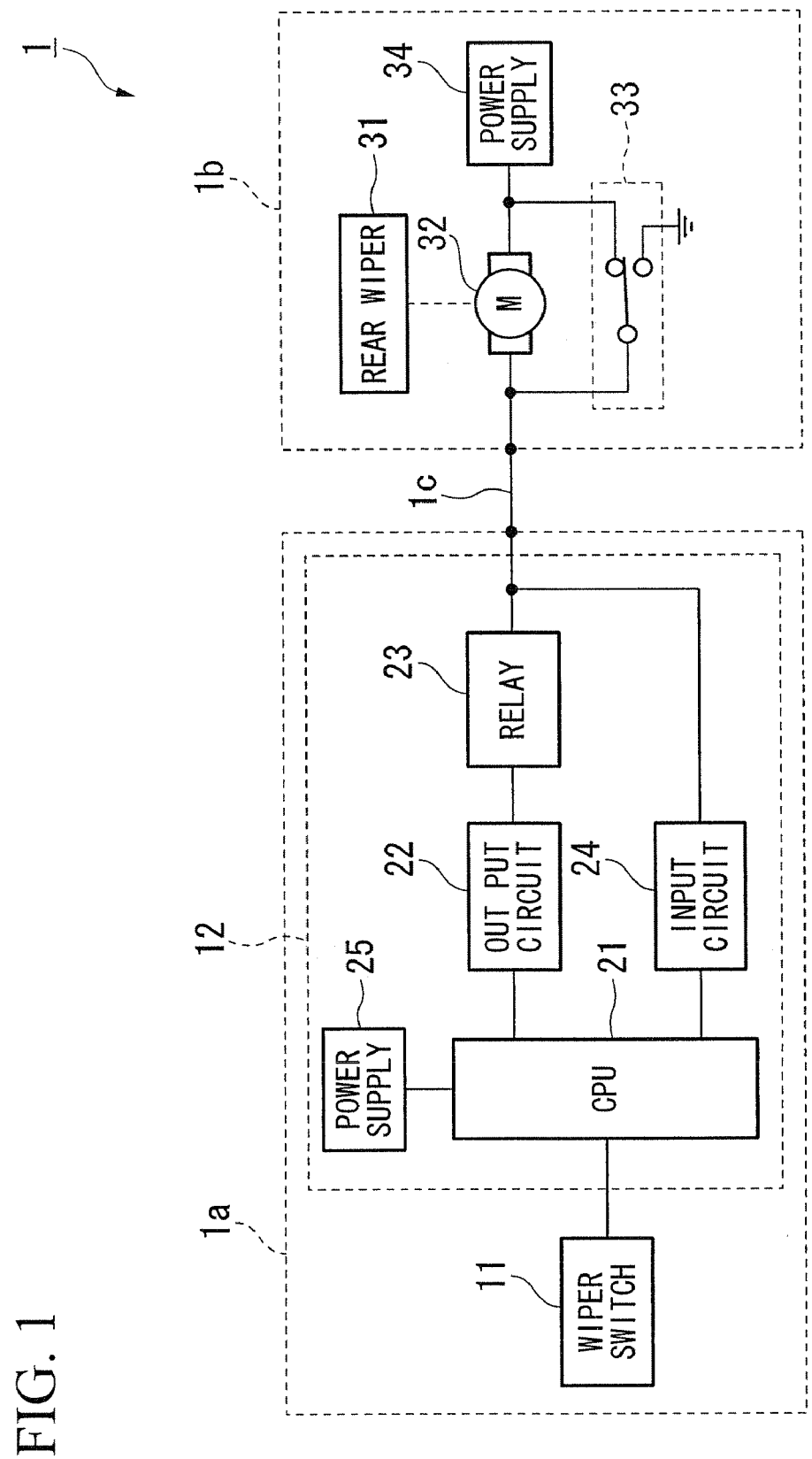
FIG. 1 is a block diagram showing one embodiment of a wiper apparatus of the present invention.

A wiper apparatus 1 of the present embodiment shown in FIG. 1 is, for example, a rear wiper apparatus mounted on a vehicle, and is provided with; a control unit 1a disposed inside the vehicle front section, and a rear wiper unit 1b disposed on a rear window (not shown in the drawing) in the vehicle rear section. The control unit 1a and the rear wiper unit 1b are connected to each other by a single signal line 1c.

The control unit 1a is provided with a wiper switch 11 and a control circuit 12. The wiper switch 11 outputs operation selection signals (for example, a rear wiper switch for instructing whether or not to operate the rear wiper 31, and a washer switch for instructing whether or not to discharge washer fluid) according to a selection operation of the operator for: whether or not to operate a rear wiper 31 described later; a set period of time for operating intervals; and whether or not to discharge washer fluid.

The control circuit 12 includes; a CPU 21, an output circuit 22, a relay 23, an input circuit 24, and a power supply 25.

The power supply 25 is connected to the CPU 21, the output circuit 22, and the input circuit 24.

The output circuit 22 is connected via the relay 23 to the single signal line 1c, and the input circuit 24 is connected to this single signal line 1c.

The CPU 21, for example, based on an operation selection signal (such as for a rear wiper switch) output from the wiper switch 11, outputs from the output circuit 22, a wiper driving signal (RRWIP OUT) that directs drive of the rear wiper 31.

The CPU 21, based on a wiper operating signal (RRWIP IN) input to the input circuit 24, controls the output timing and the like for the wiper driving signal (RRWIP OUT).

After a predetermined period of time (for example, 50 ms) has elapsed from the point in time when an output of the wiper driving signal (RRWIP OUT) at high level "1" from the output circuit 22 has stopped (that is, the point in time when the wiper driving signal (RRWIP OUT) switches from high level "1" to low level "0"), the CPU 21 performs input of the wiper operating signal (RRWIP IN) from the signal line 1c to the input circuit 24.

That is to say, in a state where the wiper driving signal (RRWIP OUT) at high level "1" is output from the output circuit 22, this wiper driving signal (RRWIP OUT) is also input to the input circuit 24. In this state, the input circuit 24 is unable to differentiate between the wiper driving signal (RRWIP OUT) and the wiper operating signal (RRWIP IN) input via the signal line 1c from an automatic stop switch 33. However, in a state after the output of the wiper driving signal (RRWIP OUT) at high level "1" has stopped, only the wiper operating signal (RRWIP IN) input via the signal line 1c from the automatic stop switch 33 is input to the input circuit 24.

Consequently, in a state where the wiper driving signal (RRWIP OUT) at high level "1" is output from the output circuit 22, the CPU 21 prohibits input operations in the input circuit 24, and permits an input operation in the input circuit 24 after a predetermined period of time (for example, 50 ms) has elapsed from when the output of the wiper driving signal (RRWIP OUT) at high level "1" from the output circuit 22 has stopped. As a result, the input circuit 24 can differentiate between the wiper driving signal (RRWIP OUT) and the wiper operating signal (RRWIP IN).

The rear wiper unit 1b is provided for example with: a rear wiper 31 comprising a wiper blade; a wiper motor 32 that imparts a driving force to the rear wiper 31; the automatic stop switch 33; and a power supply 34. The wiper motor 32 and the automatic stop switch 33 are connected to the single signal line 1c.

The automatic stop switch 33 outputs a high/low level wiper operating signal (RRWIP IN) in accordance with the rotational phase position of the wiper motor 32. For example, when the wiper motor 32 is in a stop state in a predetermined origin position, the automatic stop switch 33 outputs a wiper operating signal (RRWIP IN) at low level "0". Moreover, for example, in a wiper operating period, during which the wiper blade of the rear wiper 31 reciprocates once on the rear window corresponding to one rotation of the rotating wiper motor 32 that starts driving (that is to say, that starts receiving electric power from the power supply 34) according to a wiper driving signal (RRWIP OUT) at high level "1" during a predetermined duration Ta, the automatic stop switch 33 outputs a wiper operating signal (RRWIP IN) at high level "1".

Figure 2:
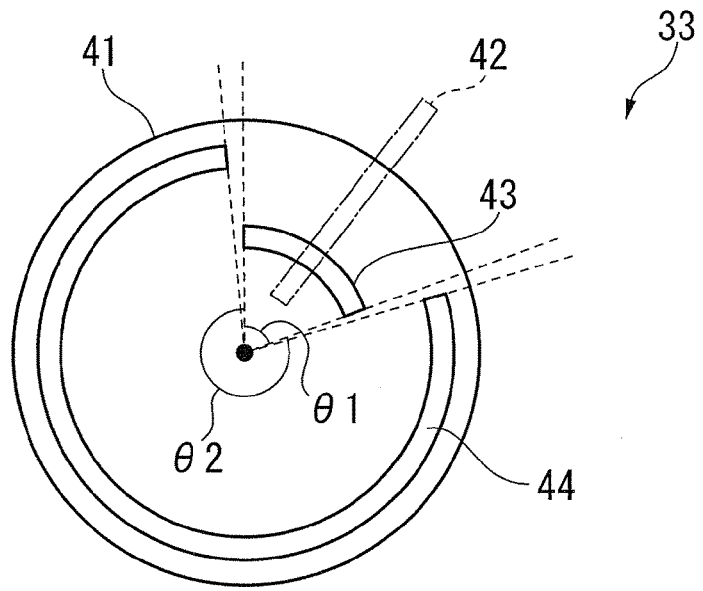
FIG. 2 is an explanatory drawing of an automatic stop switch of the wiper apparatus.

As shown in FIG. 2, the automatic stop switch 33 is provided with; a disk body 41 made from an insulative material that is connected to and rotatably supported on the rotation shaft (not shown in the drawing) of the wiper motor 32, and a fixed terminal 42 connected to the signal line 1c. On the surface of the disk body 41 there are provided an arc shaped low side conductor 43 and an arc shaped high side conductor 44 that are independent of each other. Accompanying the rotation of the disk body 41 caused by the operation of the wiper motor 32, the fixed terminal 42 comes in contact with either the low side conductor 43 or the high side conductor 44.

The low side conductor 43 is of an arc shape with a center angle $\theta 1$ and is grounded, and the high side conductor 44 is of an arc shape with a center angle $\theta 2$ ($>\theta 1$) and is set so as to attain a predetermined electric potential. When the wiper motor 32 is in a stop state at the predetermined origin position, the fixed terminal 42 is in contact with the low side conductor 43, and a wiper operating signal (RRWIP IN) at low level "0" is output to the signal line 1c. When the wiper motor 32 has rotated to the predetermined rotational phase position in accordance with the wiper driving signal (RRWIP OUT) at high level "1" during the predetermined duration Ta, the fixed terminal 42 is in contact with the high side conductor 44, and a wiper operating signal (RRWIP IN) at high level "1" is output to the signal line 1c.

When the wiper motor 32 has completed one rotation and the wiper blade of the rear wiper 31 has completed one reciprocation on the rear window, the fixed terminal 42 of the automatic stop switch 33 moves away from the high side conductor 44 and comes in contact with the low side conductor 43, so that a wiper operating signal (RRWIP IN) at low level "0" is output to the signal line 1c. Accompanying this, the electric power from the power supply 34 to the wiper motor 32 is stopped, and the rotation of the wiper motor 32 automatically stops.

The predetermined duration Ta for the wiper driving signal (RRWIP OUT) at high level "1" is set to a relatively short period of time compared to the wiper operating period.

Operation of the wiper apparatus 1 according to the present embodiment having the above described configuration is described hereunder.

Figure 3:
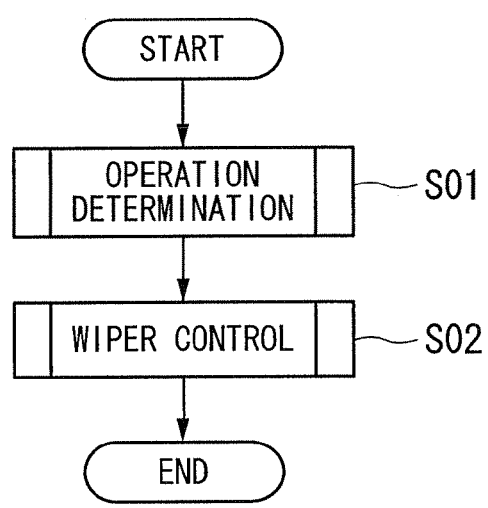
FIG. 3 is a flow chart showing an operation of the wiper apparatus.

First, in step S01 shown in FIG. 3, operation determination processing described later is executed.

In the subsequent step S02, wiper control processing described later is executed, and the series of processings is completed.

Hereunder is a detailed description of the operation determination processing in the above mentioned step S01.

Figure 4:
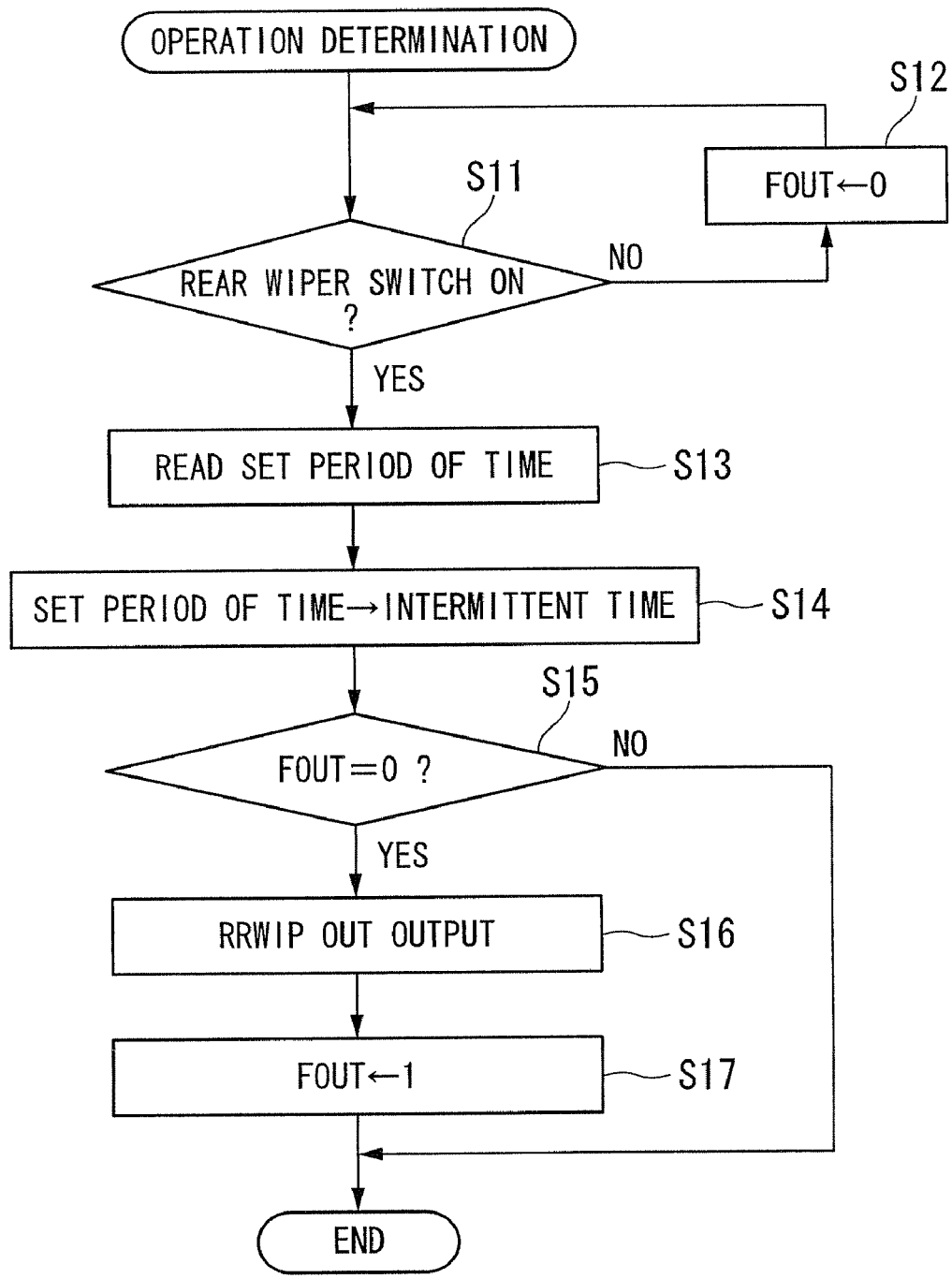
FIG. 4 is a flow chart showing details of processing for operation determination shown in FIG. 3.

First, in step S11 shown in FIG. 4, it is determined whether or not the rear wiper switch in accordance with the selection operation of the operator is in the ON state that directs operation of the rear wiper 31.

If the result of this determination is "YES", then the flow proceeds to step S13 described later.

On the other hand, if the result of this determination is "NO", then the flow proceeds to step S12. In step S12, the flag value of an output flag FOUT is set to "0", and the determination processing of step S11 is repeatedly executed.

Next, in step S13, a set period of time for operation intervals of the rear wiper 31 according to the selection operation of the operator is acquired.

Next, in step S14, the set period of time acquired in step S13 is set as an intermittent time that corresponds to the operation stop state of the rear wiper 31 from the completion time of the wiper operation period (that is, the point in time when the wiper operating signal (RRWIP IN) is switched from high level "1" to low level "0") to the drive commencement time of the wiper motor 32 (that is, the point in time when the wiper driving signal (RRWIP OUT) is switched from low level "0" to high level "1").

Next, in step S15, it is determined whether or not the flag value of the output flag (FOUT) is set to "0".

If the result of this determination is "NO", then the series of processings ends.

On the other hand, if the result of this determination is "YES", then the flow proceeds to step S16.

In step S16, a wiper driving signal (RRWIP OUT) with a high level "1" set for the predetermined duration is output.

In step S17, the flag value of the output flag FOUT is set to "1", and the series of processings ends.

Hereunder is a detailed description of the wiper control processing in the above mentioned step S02.

Figure 5:
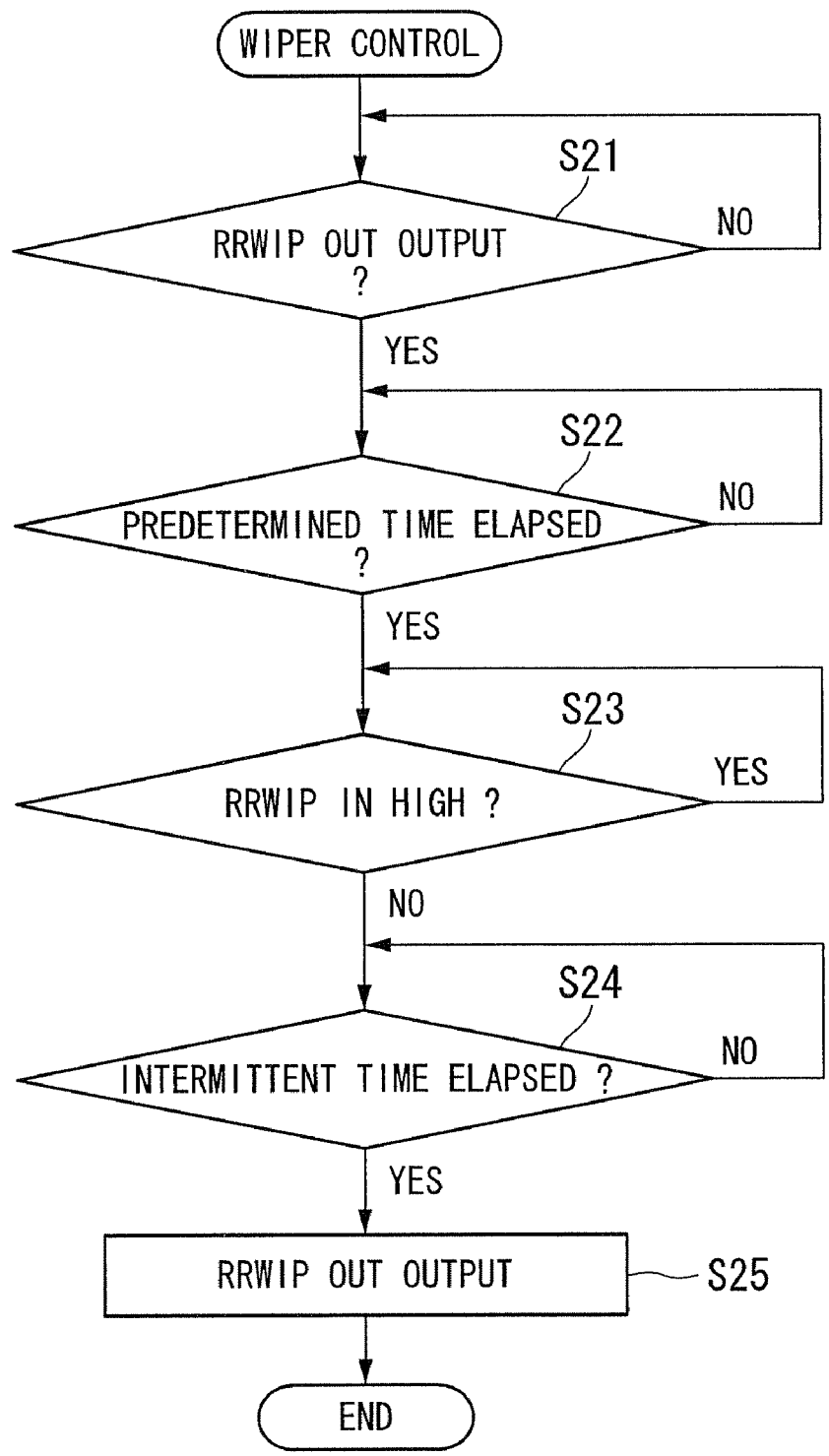
FIG. 5 is a flow chart showing details of processing for wiper control shown in FIG. 3.

First, in step S21 shown in FIG. 5, it is determined whether or not the wiper driving signal (RRWIP OUT) with a high level "1" set for the predetermined duration is output.

If the result of this determination is "NO", then the determination processing of step S21 is repeatedly executed.

On the other hand, if the result of this determination is "YES", then the flow proceeds to step S22.

In step S22, it is determined whether or not a predetermined time (for example, 50 ms) has elapsed from the output completion time of the wiper driving signal (RRWIP OUT) with a high level "1" set for the predetermined duration (that is, the point in time when the wiper driving signal (RRWIP OUT) is switched from high level "1" to low level "0").

If the result of this determination is "NO", then the determination processing of step S22 is repeatedly executed.

On the other hand, if the result of this determination is "YES", then the flow proceeds to step S23.

In step S23, it is determined whether or not the wiper operating signal (RRWIP IN) is at high level "1".

If the result of this determination is "YES", then the determination processing of step S23 is repeatedly executed.

On the other hand, if the result of this determination is "NO", then the flow proceeds to step S24.

In step S24, it is determined whether or not an intermittent time (for example, 7 sec) according to the selection operation of the operator has elapsed from the point in time when the wiper operating signal (RRWIP IN) is switched from high level "1" to low level "0".

If the result of this determination is "NO", then the determination processing of step S24 is repeatedly executed.

On the other hand, if the result of this determination is "YES", then the flow proceeds to step S25.

In step S25, a wiper driving signal (RRWIP OUT) with a high level "1" set for the predetermined duration is output, and the series of processings ends.

Figure 6:
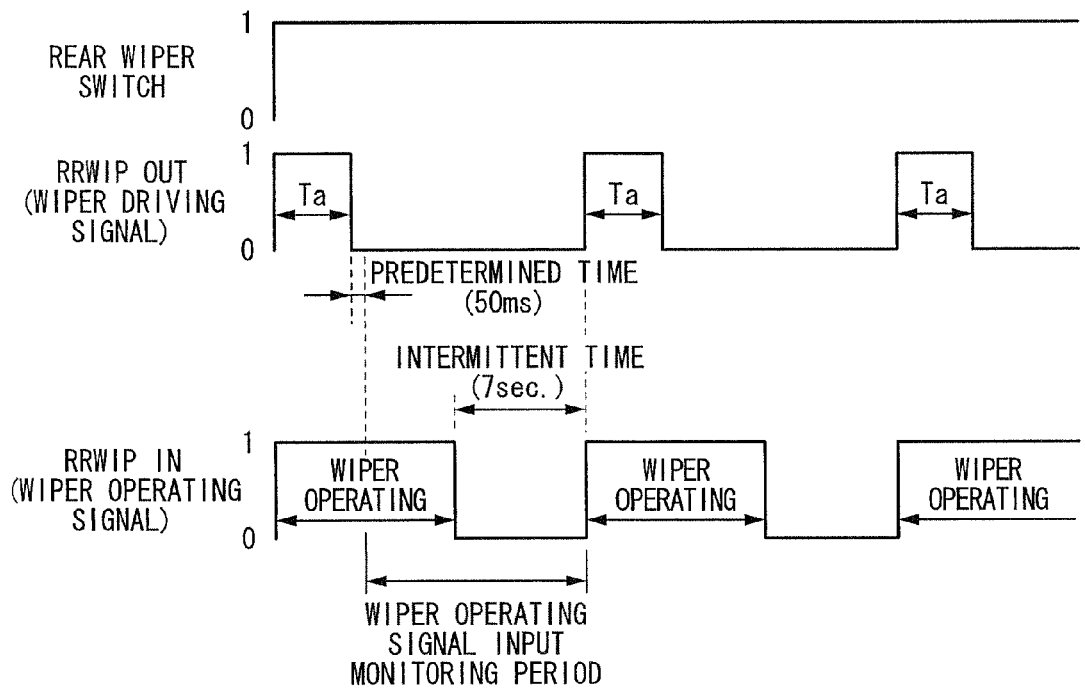
FIG. 6 is a diagram showing an example of variation over time for a rear wiper switch, a wiper driving signal, and a wiper operating signal, when the wiper apparatus is in a normal state.

As a result, in the normal state of the wiper apparatus 1, as shown in FIG. 6, when the rear wiper switch is switched from low level "0" to high level "1" according to the selection operation of the operator, and an operation of the rear wiper 31 is instructed, a wiper driving signal (RRWIP OUT) at high level "1" during the predetermined duration Ta is output from the output circuit 22, and a wiper operating signal (RRWIP IN) at high level "1" is output from the automatic stop switch 33 during the wiper operation period.

Here, the predetermined duration Ta for the wiper driving signal (RRWIP OUT) at high level "1" is a relatively short period compared to the wiper operation period (that is, the period of time during which the wiper operating signal (RRWIP IN) is at high level "1"). Consequently, at the point in time when a predetermined period of time (for example, 50 ms) has elapsed from the point in time when the wiper driving signal (RRWIP OUT) is switched from high level "1" to low level "0", as shown in FIG. 6, the wiper operating signal (RRWIP IN) is at high level "1", and this signal is input to the input circuit 24.

When the intermittent time has elapsed from the point in time when the wiper operating signal (RRWIP IN) input to this input circuit 24 is switched from high level "1" to low level "0", a wiper driving signal (RRWIP OUT) at high level "1" during the predetermined duration Ta is again output from the output circuit 22 to the signal line 1c via the relay 23.

In this case, the period of time from when a predetermined period of time (for example, 50 ms) has elapsed from the point in time when the wiper driving signal (RRWIP OUT) is switched from high level "1" to low level "0", to when the wiper driving signal (RRWIP OUT) at high level "1" during the predetermined duration Ta is output, is a period of time for monitoring an input of the wiper operating signal (RRWIP IN) (wiper operating signal input monitoring period).

Figure 7:
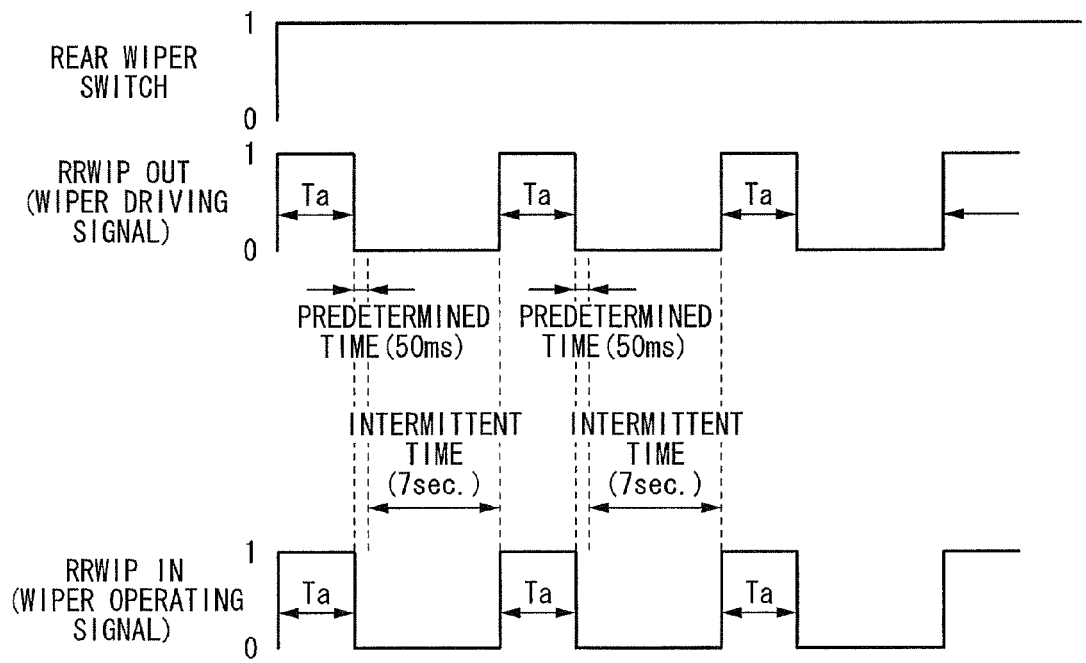
FIG. 7 is a diagram showing an example of variation over time for the rear wiper switch, the wiper driving signal, and the wiper operating signal, when the wiper apparatus is in an abnormal state (that is, a state where the rotational phase position of the wiper motor is fixed at a predetermined origin position).

On the other hand, as shown in FIG. 7 for example, when a predetermined period of time (for example, 50 ms) has elapsed from the point in time when the wiper driving signal (RRWIP OUT) is switched from high level "1" to low level "0", if the input signal to the input circuit 24 (that is, a signal corresponding to the wiper operating signal (RRWIP IN) in the normal state) is at low level "0", it is determined as an abnormal state where the rotational phase position of the wiper motor 32 is fixed at the predetermined origin position. In the case of this abnormal state, the signal input to the input circuit 24 is determined as a wiper driving signal (RRWIP OUT) output from the output circuit 22 rather than as being a wiper operating signal (RRWIP IN), and when the intermittent time has elapsed from this point in time, a wiper driving signal (RRWIP OUT) at high level "1" during the predetermined duration Ta is output again.

Figure 8:
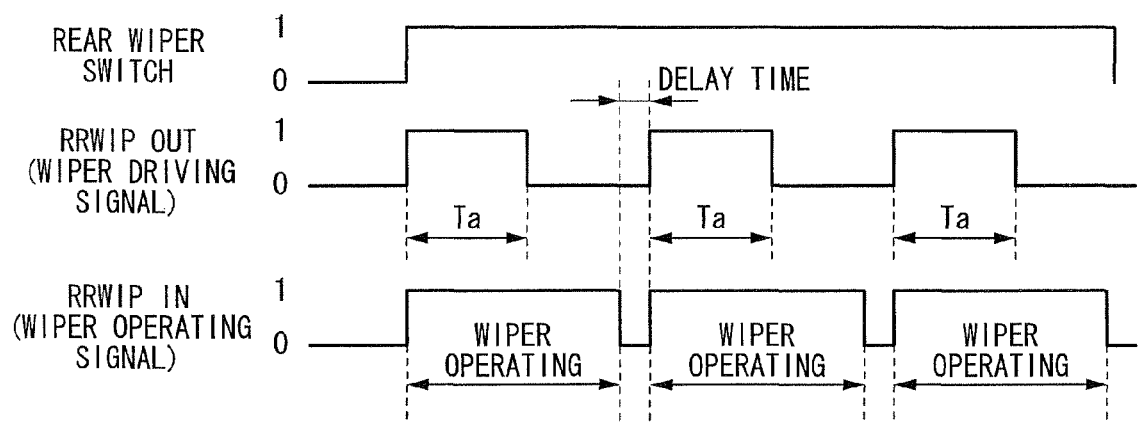
FIG. 8 is a diagram showing an example of variation over time for the rear wiper switch, the wiper driving signal, and the wiper operating signal for a continuous operating condition of the rear wiper, when the wiper apparatus is in a normal state.

The set period of time for the operation interval of the rear wiper 31 in the above mentioned step S13 can be changed according to the selection operation of the operator. For example, FIG. 8 shows a continuous operation state where the set period of time is set to zero. When a predetermined delay time in a control system has elapsed from the point in time when the wiper operating signal (RRWIP IN) is switched from high level "1" to low level "0", a wiper driving signal (RRWIP OUT) at high level "1" during the predetermined duration Ta is output again from the output circuit 22.

Figure 9:
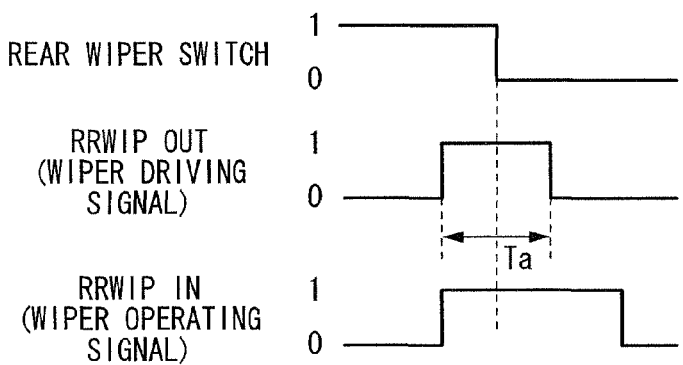
FIG. 9 is a diagram showing an example of variation over time for the rear wiper switch, the wiper driving signal, and the wiper operating signal where the operation of the rear wiper is stopped, when the wiper apparatus is in a normal state.

When the rear wiper switch is switched from high level "1" to low level "0" according to the selection operation of the operator, and the rear wiper 31 is instructed to stop its operation, in the case where the wiper driving signal (RRWIP OUT) is at high level "1" as shown in FIG. 9 for example, output of the wiper driving signal (RRWIP OUT) at high level "1" is continued during the predetermined duration Ta without changing the period of time during which this high level "1" is to be continued (that is, the predetermined duration Ta).

Figure 10:
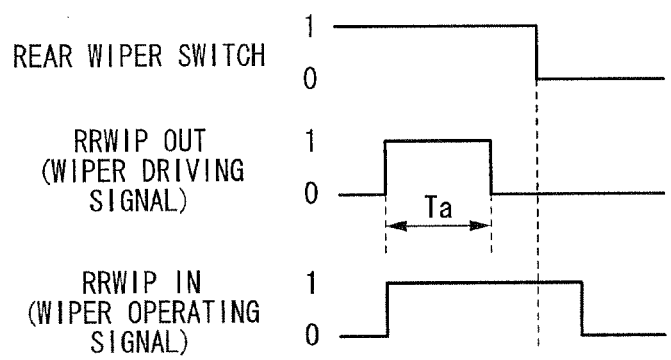
FIG. 10 is a diagram showing an example of variation over time for the rear wiper switch, the wiper driving signal, and the wiper operating signal where the operation of the rear wiper is stopped, when the wiper apparatus is in a normal state.

For example, FIG. 10 shows a case where in the normal state of the wiper apparatus 1, the rear wiper switch is switched from high level "1" to low level "0" according to the selection operation of the operator, and the rear wiper 31 is instructed to stop its operation. Even in the case where the wiper driving signal (RRWIP OUT) is at low level "0", in a state where a signal input to the input circuit 24 (that is, a signal corresponding to a wiper operating signal (RRWIP IN) in the normal state) is at high level "1", the operation of the rear wiper 31 according to this wiper operating signal (RRWIP IN), that is, the operation until the rotational phase position of the wiper motor 32 reaches the predetermined origin position, is completed.

Figure 11:
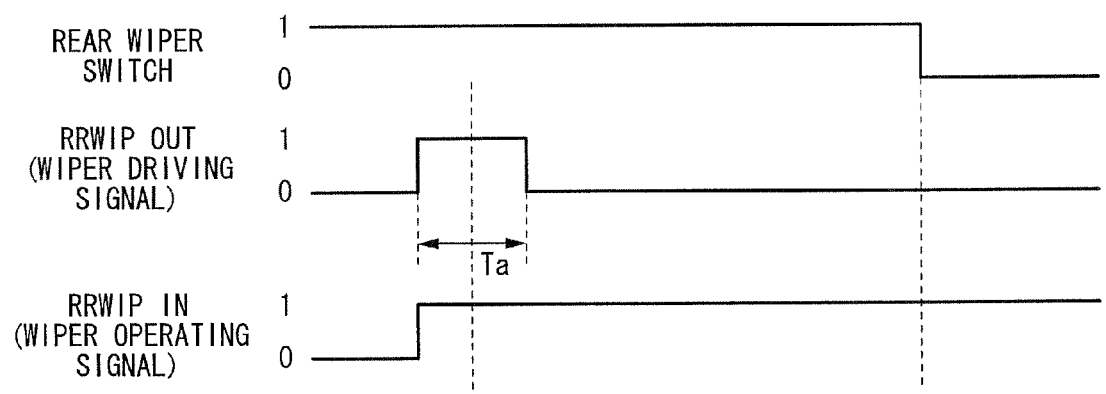
FIG. 11 is a diagram showing an example of variation over time for the rear wiper switch, the wiper driving signal, and the wiper operating signal, when the wiper apparatus is in an abnormal state (that is, an abnormal state where the rotational phase position of the wiper motor is fixed at a position other than the predetermined origin position).

On the other hand, FIG. 11 shows a case where in the abnormal state, the rear wiper switch is switched from high level "1" to low level "0" according to the selection operation of the operator, and the rear wiper 31 is instructed to stop its operation. Even in a state where the wiper driving signal (RRWIP OUT) is at low level "0" and the signal input to the input circuit 24 (that is, a signal corresponding to the wiper operating signal (RRWIP IN) in the normal state) is at high level "1", if the period of time during which the signal input to the input circuit 24 is at high level "1" is longer than a predetermined period of time (for example, a wiper operation period during which the wiper blade of the rear wiper 31 reciprocates once on the rear window corresponding to one rotation of the wiper motor 32 in a rotating state), then it is determined as an abnormal state where the rotational phase position of the wiper motor 32 is fixed at an arbitrary position other than the origin position.

As described above, according to the wiper apparatus 1 of the present embodiment, in a state where a wiper operating signal (RRWIP IN) and a wiper driving signal (RRWIP OUT) can be differentiated from each other, the input circuit 24 and the output circuit 22 can share the single signal line 1c. Consequently, it is possible to ensure desired reliability for the operation of the rear wiper 31 and reduce the cost required for configuring the apparatus, while reducing the weight of the apparatus and the wiring space required for wiring the signal line 1c.

Since the wiper driving signal (RRWIP OUT) is output when a predetermined set period of time has elapsed from the point in time when input of the wiper operating signal (RRWIP IN) has stopped, then for example in the case where the wiper blade stops at a position other than the predetermined origin position, it is possible to prevent excessively frequent outputs of the wiper driving signal (RRWIP OUT). As a result, it is possible to prevent the occurrence of an operation not intended by the operator, and to prevent an increase in power consumption.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wiper apparatus comprising:
    a wiper switch that outputs an operation selection signal according to selections made upon the presence of operation of a wiper and set period of time for operation intervals;
    an operation state detection device that detects an operation state of said wiper and outputs a wiper operating signal;
    a control device provided with an output section that outputs a wiper driving signal for driving said wiper based on said operation selection signal and said wiper operating signal, and an input section that inputs said wiper operating signal;
    a wiper motor that drives said wiper according to said wiper driving signal; and
    a power supply that supplies electric power to said wiper motor, wherein:
    said wiper motor and said control device are connected by a single signal line;
    said operation state detection device and said input section are connected to said signal line; and
    said control device prohibits input operations in the input section when the wiper driving signal is output from the output section and permits input of said wiper operating signal from said signal line when a predetermined period of time has elapsed from a point in time when an output of said wiper driving signal from said output section has stopped.

2. The wiper apparatus according to claim 1, wherein said control device outputs said wiper driving signal when a predetermined set period of time has elapsed from a point in time when input of said wiper operating signal has stopped.

* * * * *